US008977071B2

(12) United States Patent
Kido et al.

(10) Patent No.: US 8,977,071 B2
(45) Date of Patent: Mar. 10, 2015

(54) IMAGE CONVERTING DEVICE AND IMAGE CONVERTING SYSTEM

(75) Inventors: Hideaki Kido, Hitachi (JP); Shoji Muramatsu, Hitachinaka (JP); Hiroyuki Hamasaki, Kanagawa (JP); Akihiro Yamamoto, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 273 days.

(21) Appl. No.: 13/185,007

(22) Filed: Jul. 18, 2011

(65) Prior Publication Data
US 2012/0013794 A1    Jan. 19, 2012

(30) Foreign Application Priority Data

Jul. 16, 2010   (JP) ................................ 2010-161796

(51) Int. Cl.
| | |
|---|---|
| *G06K 9/36* | (2006.01) |
| *G06K 9/32* | (2006.01) |
| *G09G 5/00* | (2006.01) |
| *G09G 5/02* | (2006.01) |
| *H04N 11/20* | (2006.01) |
| *H04N 7/01* | (2006.01) |
| *H04N 5/44* | (2011.01) |
| *H04N 9/74* | (2006.01) |
| *H04N 3/223* | (2006.01) |
| *H04N 1/46* | (2006.01) |
| *H04N 1/393* | (2006.01) |
| *G06T 3/00* | (2006.01) |

(52) U.S. Cl.
CPC ....................................... *G06T 3/00* (2013.01)

USPC ........... 382/278; 382/287; 382/293; 382/295; 345/619; 345/698; 345/699; 348/441; 348/561; 348/580; 348/704; 358/525; 358/451

(58) Field of Classification Search
None
See application file for complete search history.

(56) References Cited

U.S. PATENT DOCUMENTS

| | | | |
|---|---|---|---|
| 2002/0118751 A1 | 8/2002 | Akiyoshi et al. | |
| 2003/0218683 A1* | 11/2003 | Kurase | ........................... 348/335 |
| 2006/0029294 A1* | 2/2006 | Akiyoshi et al. | ............... 382/300 |
| 2010/0165104 A1* | 7/2010 | Fujita et al. | ................... 348/148 |

FOREIGN PATENT DOCUMENTS

| | | |
|---|---|---|
| EP | 1 100 261 A1 | 5/2001 |
| JP | 2001-145012 A | 5/2001 |

(Continued)

OTHER PUBLICATIONS

Office Action issued Feb. 25, 2014 in Japanese Patent Application No. 2010-161796 with English language translation.

(Continued)

*Primary Examiner* — Randolph I Chu
(74) *Attorney, Agent, or Firm* — Miles & Stockbridge PC

(57) ABSTRACT

Means which enables image conversion in which a plurality of conversion results can be output without once saving all of video-image data, which has been input from image-pickup means, in a storage medium is provided. A single line memory having a plurality of lines is used while switching the role thereof for a reading use by a video-image converting means and a use for inputting image data from the image-pickup means. The image converting means obtains an input image, which is in the line memory, and carries out conversion of the input image based on a conversion specifying means interpreted by an instruction decoder.

6 Claims, 14 Drawing Sheets

(56) References Cited

FOREIGN PATENT DOCUMENTS

| JP | 2002-230543 | | 8/2002 |
|----|-------------|---|--------|
| JP | 2003-333588 | A | 11/2003 |
| JP | 2004-032464 | | 1/2004 |
| JP | 2007-114923 | A | 5/2007 |
| JP | 2007-264831 | A | 10/2007 |

OTHER PUBLICATIONS

Japanese Office Action for related Japanese Application No. 2010-161796, mailed Nov. 25, 2014.

* cited by examiner

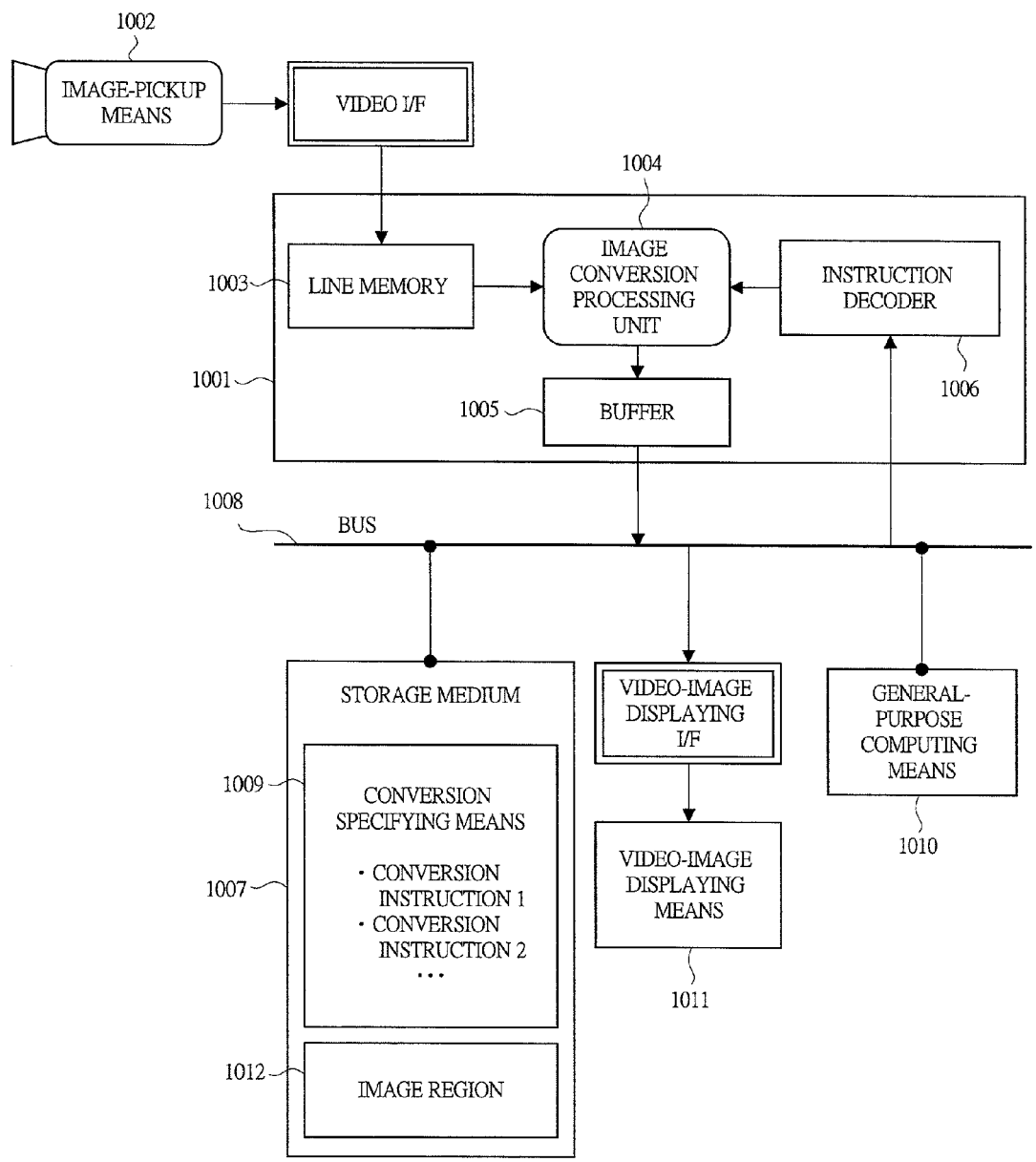

COORDINATES
3004 : (1,1)
3005 : (1,4)
3006 : (4,4)
3007 : (4,1)

COORDINATES
3011 : (1.5,1.5)
3012 : (1.5,5.5)
3013 : (4.4,4.3)
3014 : (5.6,1.7)

FIG. 5

5001 : TRIANGLE
5002 : SRC  x1, SRC  y1
5003 : DST  x1, DST  y1
5004 : SRC  x2, SRC  y2
5005 : DST  x2, DST  y2
5006 : SRC  x3, SRC  y3
5007 : DST  x3, DST  y3

5008 : SYNC
5009 : SYNCF

5010 : WRITE  xxxx yyyy

5011 : INTR

5012 : END

FIG. 9

<u>11001</u> a ⟶ WRITE <8001> 3
b ⟶ WRITE <8002> 5
SYNC

WRITE <8006> DST_A
TRIANGLE
......                    ⎤ 11002

WRITE <8006> DST_B
TRIANGLE
......                    ⎤ 11003

SYNC

WRITE <8006> DST_A
TRIANGLE
......

WRITE <8006> DST_B
TRIANGLE
......

SYNC

WRITE <8006> DST_A
TRIANGLE
......

WRITE <8006> DST_B
TRIANGLE
......

SYNC

END

IMAGE CONVERTING DEVICE AND IMAGE CONVERTING SYSTEM

CROSS-REFERENCE TO RELATED APPLICATION

The present application claims priority from Japanese Patent Application No. 2010-161796 filed on Jul. 16, 2010, the content of which is hereby incorporated by reference into this application.

TECHNICAL FIELD OF THE INVENTION

The present invention relates to an image converting device and an image processing method. More particularly, the present invention relates to obtaining various transform images at a high speed with respect to image data obtained from image-pickup means.

BACKGROUND OF THE INVENTION

Recently, a vehicle-mounted system equipped with a plurality of image input devices is disseminating. For example, there is a system in which cameras are installed on the front, back, left, and right of an automobile, respectively, and all of the surrounding environments are shown to a user, who is a driver, by video images to enhance safety during driving.

In such a system, sometimes, the images viewed from a virtual viewpoint (for example, video images as if looking down from above the vehicle) are generated in order to display more easy-to-understand images to the user. In this process, each of the input images has to be subjected to conversion processing so as to form the images viewed from the virtual viewpoint.

Moreover, not only the images like those of the look-down conversion, but also the images which have undergone correction of lens distortion are also required in order to facilitate image processing. Also in this case, the images have to be subjected to conversions as preprocessing. In this manner, obtaining the transform images corresponding to uses is required as needs. The number of the usages is not always limited to one; for example, it is required to obtain the look-down images to be shown to the user and distortion-corrected images for carrying out image processing from one input image.

As a configuration that obtains the transform images, for example, a configuration in which an image-pickup device, correcting means, and a storage medium are mutually connected via a bus is conceivable as described in Japanese Patent Application Laid-Open Publication No. 2003-333588 (Patent Document 1).

In Japanese Patent Application Laid-Open Publication No. 2001-145012 (Patent Document 2) and Japanese Patent Application Laid-Open Publication No. 2007-114923 (Patent Document 3), a small-volume buffer is provided between an image-pickup device and correcting means to provide a measure for shortening the processing time that is taken from video-image input to image conversion.

SUMMARY OF THE INVENTION

Meanwhile, when a detection delay occurs during driving of an automobile, an accident may be caused in many cases. Therefore, in an image processing device like the one mounted in an automobile, a real-time property is sometimes required like obstacle detection.

The technique described in Patent Document 1 has the configuration in which the image data input from the image-pickup device is once saved in the storage medium via the bus, and the image data is converted by an image converting device. This configuration has a problem that, in total, three times of image data transfer occur from the image-pickup device to the storage medium, from storage medium to the image converting device, and from the image converting device to the storage medium, wherein the load on the bus is large. Moreover, the image data corresponding to one frame is once saved in the storage medium and then activated by the image converting device; therefore, the processing time is taken from acquisition of the image by the image-pickup device until the image is converted by the image converting device.

In the techniques of Patent Document 2 and Patent Document 3, a small-volume buffer is provided between the image-pickup device and the image converting device, and the data that comes in from the image-pickup device is sequentially input to the image converting device. Therefore, the data transfer in Patent Document 1 from the image-pickup device to the storage medium and from the storage medium to the image converting device is eliminated, the load on the bus can be reduced, and the processing time taken from the image input to the image conversion can be also shortened. However, flexible conversions like outputting a plurality of images at one time from one input image or changing the setting of the converting device during image conversion cannot be carried out.

It is a preferred aim of the present invention to provide a device that enables image conversion capable of outputting a plurality of conversion results without once saving all of video-image data, which has been input from an image-pickup device, into a storage medium.

The above and other preferred aims and novel characteristics of the present invention will be apparent from the description of the present specification and the accompanying diagrams.

The typical ones of the inventions disclosed in the present application will be briefly described as follows.

An image converting device according to a typical concept of the embodiments of the present invention includes: an image input device that obtains input image data; an image converter that executes operation about image conversion in accordance with two or more instructions defining the operation; a line memory used in transmission and reception of data between the image input device and the image converter; and a conversion specifier that describes a corresponding relation between the input image data obtained into the line memory by the image input device and converted image data after conversion, in which the conversion specifier is described by combining the instructions, and the operation or an output destination of the image converter is specified or changed during operation by interpreting the instructions.

In the image converting device, the image converter may be configured to generate a plurality of images with respect to the input image data in the line memory.

The image converting device may further comprise a synchronizer that synchronizes image input to the line memory with the image converter in accordance with a waiting instruction that specifies input wait of the image data input to the line memory, in which the waiting instruction is present as an instruction of the two or more instructions defining the operation.

In the image converting device, the image converter may be configured to read the input image data from any position in the line memory.

In the image converting device, two or more types of the conversion specifiers may be configured to be disposed in a general-purpose storage medium, and one of the two or more types of the conversion specifiers in the general-purpose storage medium may be configured to be selected for use.

In the image converting device, the conversion specifier may, be configured to be programmed by a general-purpose computing unit.

The image converting device may further comprise a video-image display by which a plurality of conversion results with respect to one video-image input are output.

In the image converting device, the conversion specifier describes correspondence between one region of the input image data and one region of the converted image data by triangle patches, bases of two or more of the triangle patches of an input side are aligned to form a strip-like shape, and two or more of the triangle patches of the converted image data have variable shapes.

An image converting system according to a typical concept of the embodiments of the present invention comprises two or more image converting devices, each of the image converting devices including an image input device, an image converter, and a line memory, in which the two or more image converting devices output conversion results to a storage medium common to each other while synchronizing with each other.

An image converting system according to another typical concept of the embodiments of the present invention comprises two or more image converting devices, each of the image converting devices including an image input device, an image converter, and a line memory, in which the image converting system further includes a video-image display, and the two or more image converting devices output conversion results to the video-image display while synchronizing with each other.

When the image converting device according to the present invention is used, flexible conversion can be carried out with a small amount of the line memory.

Moreover, when the image converting device according to the present invention is used, various transform images can be obtained at a high speed.

When the plurality of image converting devices according to the present invention are combined, various applications can be carried out with respect to the image output.

BRIEF DESCRIPTIONS OF THE DIAGRAMS

FIG. 1 illustrates a block diagram illustrating usage environment of an image converting device according to a first embodiment of the present invention;

FIG. 5 illustrates an example of a description of a triangle patch of conversion specifier;

FIG. 9 illustrates a conceptual diagram about a conversion list which converts a single input image to a plurality of output images;

DESCRIPTIONS OF THE PREFERRED EMBODIMENT

Figure 2A:
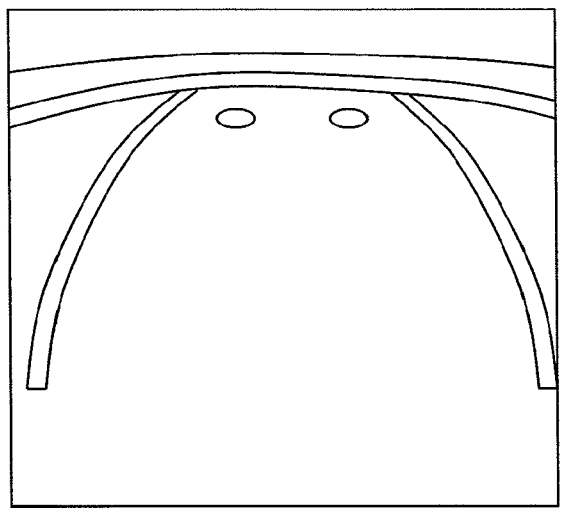
FIG. 2A illustrates a conceptual diagram illustrating an input image.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Hereinafter, an embodiment of the present invention will be described with reference to the diagrams.

(First Embodiment)

FIG. 1 is a block diagram illustrating usage environment of an image converting device 1001 according to a first embodiment of the present invention.

Image-pickup means 1002 such as a camera is connected to the image converting device 1001 via a video I/F.

The image-pickup means 1002 is image-input means which outputs digital image data, which is obtained by image pickup per line to the image converting device 1001. The properties of obtained images such as still images, moving images, infrared images, and temperature distribution images are not limited as long as the input images most appropriate for obtaining output images can be obtained.

The internal configuration of the image converting device 1001 includes a line memory 1003, an image conversion processing unit 1004, a buffer 1005, and an instruction decoder 1006.

The line memory 1003 is a storage medium such as a RAM having a capacity for saving several lines to several tens of lines of line data.

The image conversion processing unit 1004 reads arbitrary positions of the data stored in the line memory 1003 and carries out conversion of the image data by means specified by general-purpose computing means 1010 via the instruction decoder 1006. The image conversion processing unit 1004 outputs converted image data to the buffer 1005, which is in a subsequent stage.

The buffer 1005 is a storage medium such as a RAM, which is used for primary storage of the data when the converted image data is to be output to outside via a bus 1008. The converted image data is stored at an appropriate position in the buffer 1005 and output to a storage medium 1007 and video-image displaying means 1011, which will be described later.

The instruction decoder 1006 is a decoder circuit, which decodes conversion instructions notified via the bus 1008 and transmits conversion contents of the instructions to the image conversion processing unit 1004.

The bus 1008 is a general-purpose bus for connecting the image converting device 1001 and the outside of the image converting device 1001 to each other.

The image converting device 1001 is connected to the storage medium 1007, the general-purpose computing means 1010, and the video-image displaying means 1011 via the bus 1008.

The storage medium 1007 is a non-volatile or/and volatile storage medium storing conversion specifying means 1009 according to the present invention, in addition to a program for operating the general-purpose computing means 1010. The conversion specifying means 1009 is saved in the general-purpose storage medium 1007; therefore, the data therein can be subjected to read/write also from the general-purpose computing means 1010, the video-image displaying means 1011, etc.

The conversion specifying means 1009 is a description about the corresponding relations of input images and output images (instruction set). The present embodiment presupposes usage of conversion specification based on triangle patches. In the conversion specification, images are divided into small regions of fine triangles, and corresponding relations of the vertices of the image before conversion and the image after conversion are described. The conversion specifying means 1009 can specify a plurality of after-conversion vertices (triangle patches) with respect to one before-conversion vertex (triangle patch) in the line memory.

A central processing unit such as a CPU is presupposed as the general-purpose computing means 1010.

The video-image displaying means 1011 is video-image displaying means such as a flat panel display or a head-up display. This case also presupposes the case in which video images converted by the image converting device 1001 are to be output.

Next, the way how processing is carried out will be explained based on FIG. 1.

When the image conversion processing unit 1004 detects that the before-transform image data necessary for conversion has been accumulated in the line memory 1003, the image conversion processing unit 1004 reads the before-transform image data and starts image conversion. The "image conversion" referred herein means a conversion process like the one illustrated in FIGS. 2A, 2B, and 2C.

Figure 2B:
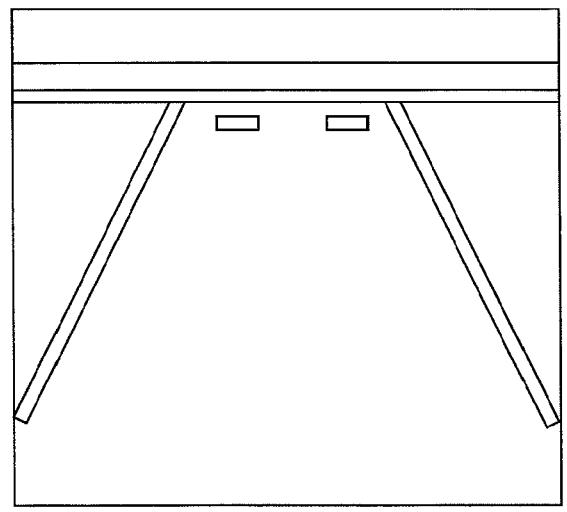
FIG. 2B illustrates a conceptual diagram illustrating a distortion-corrected image.
Figure 2C:
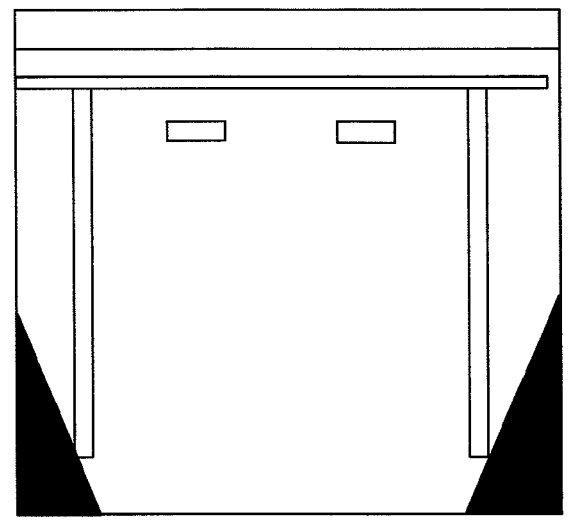
FIG. 2C illustrates a conceptual diagram illustrating an overhead view image.

FIGS. 2A, 2B, and 2C illustrate conceptual diagrams illustrating an input image, a distortion-corrected image, and an overhead view image to the present invention, respectively. In the diagrams, FIG. 2A illustrates image data which is obtained by the image-pickup means 1002 and has not been changed. FIG. 2B illustrates the converted image after lens distortion correction of the image-pickup means 1002. FIG. 2C illustrates a converted image based on a looking-down from a third-person viewpoint that has a viewpoint up in the air.

The conversion from FIG. 2A to FIG. 2B is specified by sending an instruction, which is defined in the conversion specifying means 1009, to the instruction decoder 1006.

The instruction decoder 1006 receives the conversion specifying means 1009 recorded in the storage medium 1007. In this process, the general-purpose computing means 1010 reads an appropriate instruction of the conversion specifying means 1009 and outputs the instruction to the instruction decoder 1006. The instruction decoder 1006 decodes the received instruction and outputs the instruction to the image conversion processing unit 1004. The image conversion processing unit 1004 executes a conversion process based on the decoded instruction.

Figure 3A:
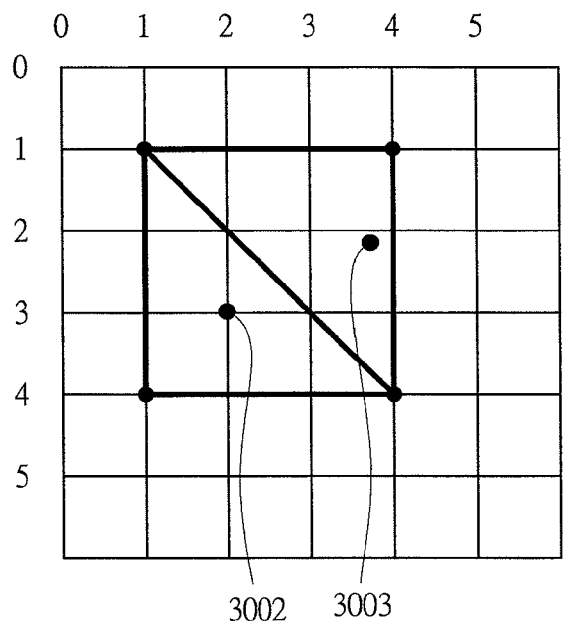
FIG. 3A illustrates a conceptual diagram illustrating a basic example of a conversion using triangle patches for input.
Figure 3B:
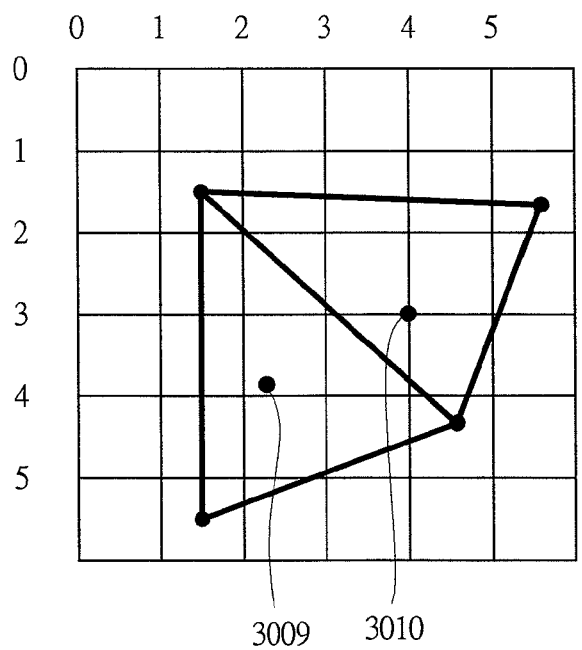
FIG. 3B illustrates a conceptual diagram illustrating a basic example of a conversion using triangle patches for output.

Next, image conversion using the triangle patches will be described as an example of the present embodiment. FIGS. 3A and 3B illustrate conceptual diagrams illustrating a basic example of the conversion using the triangle patches. FIG. 3A illustrates an image input to the image conversion processing unit 1004. FIG. 3B illustrates an image output from the image conversion processing unit 1004.

In the input image of FIG. 3A, two triangle patches 3002 and 3003 are present. The vertices of the triangle patch 3002 are composed of vertices 3004, 3006, and 3007. The vertices of the triangle patch 3003 are composed of vertices 3004, 3005, and 3006.

These two triangle patches 3002 and 3003 are converted by the image conversion processing unit 1004 to triangle patches 3009 and 3010 of the output image of FIG. 3B.

Regarding the correspondence of the vertices, the vertices 3004 to 3007 of the input image correspond to vertices 3011 to 3014 of the output image.

Figure 4:
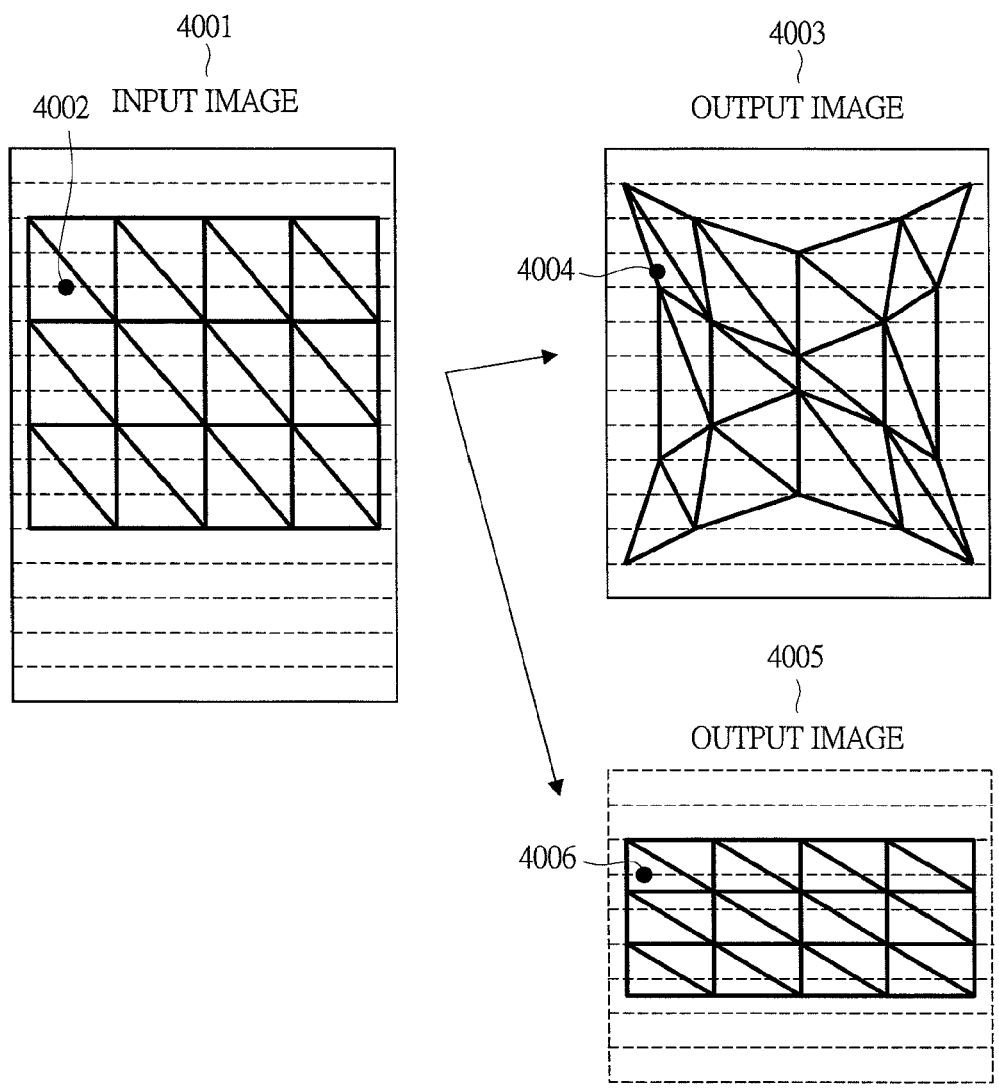
FIG. 4 illustrates a conceptual diagram illustrating an example of the conversion using the triangle patches.

Various conversions are carried out by using such triangle patches. FIG. 4 illustrates conceptual diagrams illustrating an example of the conversion using the triangle patches. In these diagrams, obtaining different output images from one input image 4001 by two conversion methods is conceived. Note that the input/output images illustrated from FIG. 4 to FIG. 7 are divided into strips by broken lines. Each of the strips represents single line data on the image.

An output image 4003 presupposes the conversion in which the distortion of the image of the input image 4001 is corrected by using a lens having barrel-shaped distortion. On the other hand, an output image 4005 is processed to reduce the vertical length (=height) of the input image 4001 by half and a result is output.

The "barrel-shaped distortion" refers to distortion which bulges like a barrel more in the outer side than at the center of the image, for example, like the image of FIG. 2A.

First, the input image 4001 is presupposed, and the input image is divided by triangle patches as illustrated in the diagram. The vertices of the triangle patches are converted to form new triangle patches on the virtual output image 4003 so as to correct the barrel-shaped distortion. The triangle patch on the input image (herein, the triangle patch 4002 of the input image 4001) and the triangle patch on the output image (herein, the triangle patch 4004 of the output image 4003) correspond to each other one-to-one.

This example is a conversion in which one output image is formed with respect to one input image. However, converting two or more output images from one input image is also conceivable. In FIG. 4, the output image 4005 is also described in addition to the output image 4003. This presupposes that two or more output images are to be obtained from above-described single input image. In this case, the triangle patch 4002 of the input image 4001, the triangle patch 4004 of the output image 4003, and a triangle patch 4006 of the output image 4005 are corresponding mutually.

To convert two or more output images from a single input image in this manner, the correspondence of the conversion of the one-to-multiple triangle patches has to be also described in the conversion specifying means.

FIG. 5 illustrates an example of the description of a triangle patch of the conversion specifying means 1009.

The correspondence between the triangle patches is specified by a TRIANGLE command 5001. A row 5001 to a row 5007 of FIG. 5 are the descriptions specifying the corresponding relation. A row 5002, a row 5004, and a row 5006 are specifying the coordinates of an input image (SRC). On the other hand, a row 5003, a row 5005, and the row 5007 are representing the coordinates of an output image (DST). In the diagram, each of x# and y# (# represents an integer of 1 or larger) represents the coordinates of one vertex. The rows having equal # represent a pair.

Conversion is described by repeating the TRIANGLE command and specification of vertices. However, the method of describing triangle patches is not limited to this.

For example, continuous triangle patches sometimes share the coordinates of two vertices like FIGS. 3A and 3B. Therefore, in such a case, it is desirable to use a command form that omits the redundancy of the overlapping part.

Figure 6:
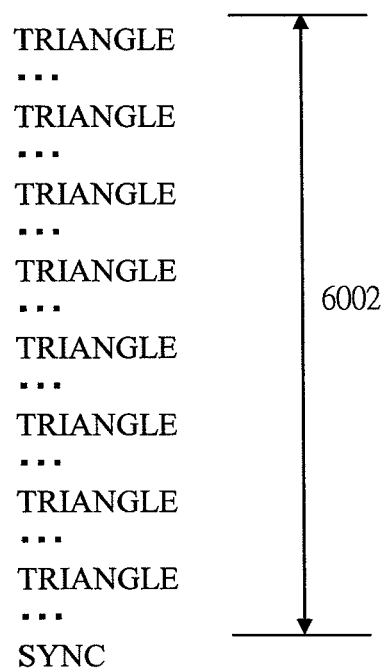
FIG. 6 illustrates an example of a description of triangle patches described in a form that a part of the conversion of FIG. 4 is omitted.
Figure 7:
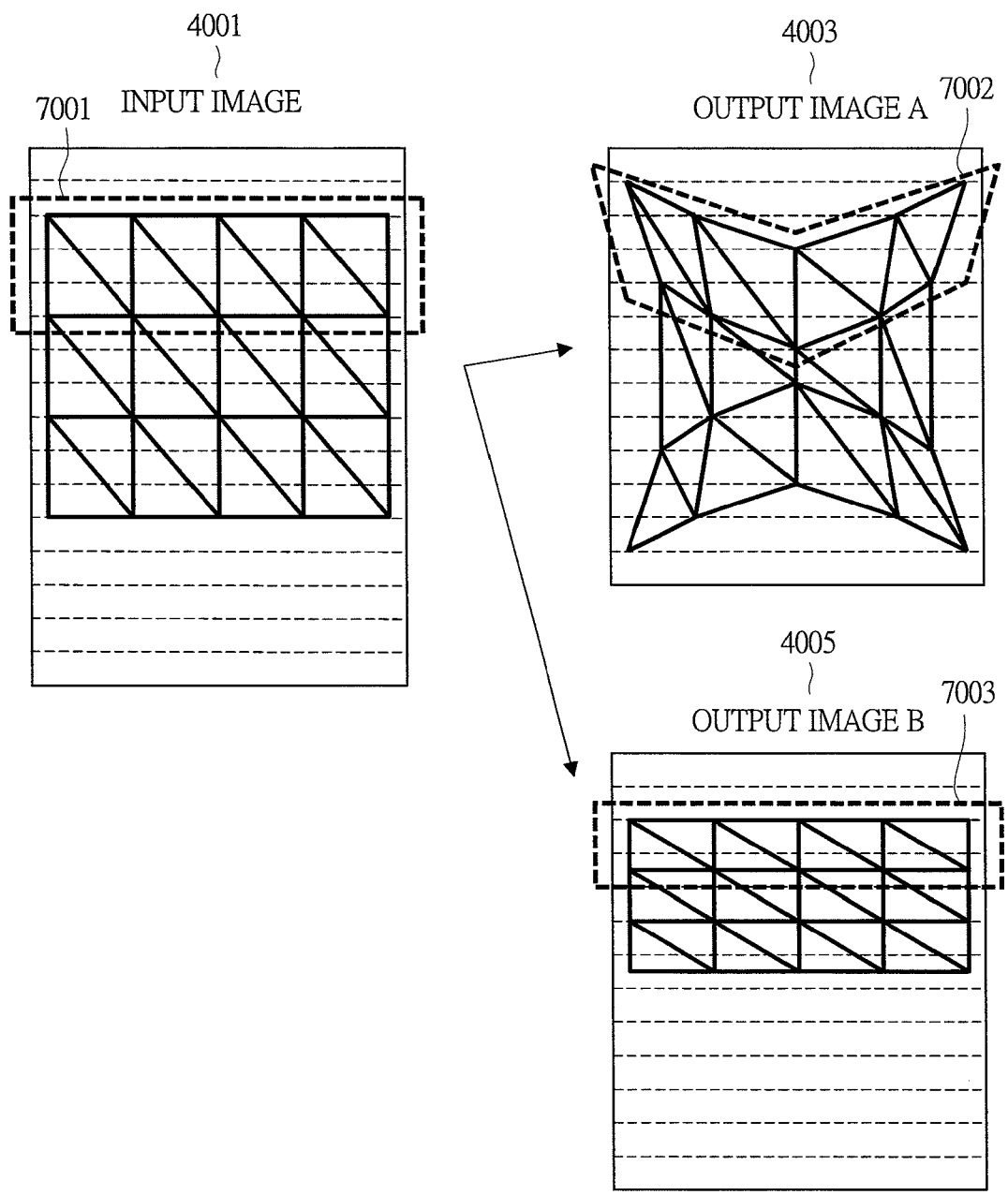
FIG. 7 illustrates a diagram illustrating which part of FIG. 4 is corresponding to the description of the triangle patches of FIG. 6.

FIG. 6 illustrates an example of the description of triangle patches described in the form that a part of the conversion of FIG. 4 is omitted. FIG. 7 illustrates a diagram illustrating which part of FIG. 4 is corresponding to the description of the triangle patches of FIG. 6.

The description of the triangle patches of FIG. 6 corresponds to the conversion from a conversion object 7001 (a range of the input image 4001) to a converted object 7002 (a range of the output image 4003) and a converted object 7003 (a range of the output image 4005) of FIG. 7.

In the description of the triangle patches, the correspondence of three vertices (rows 5002 to 5007 of FIG. 5) is omitted by ellipses.

In the conversion of FIG. 7, the conversion object 7001 includes eight triangle patches. Therefore, in the description of the triangle patches of FIG. 6, the description corresponding to these eight triangle patches is required. Therefore, eight TRIANGLE commands are required. Also in FIG. 6, eight TRIANGLE commands are present (6002 in FIG. 6).

A SYNC command is described at the end of FIG. 6. This command is a command that causes the image conversion processing unit 1004 to wait until a specified number of lines of video-image input are separately input. As a conceivable method, the number of lines waited by the SYNC command is defined in advance or individually set for each SYNC command. However, in FIG. 6, the number of lines waited by the SYNC command is a constant number.

The number of the lines waited by the SYNC command is hereinafter described as READ_LINES. The SYNC command causes the processing of the image conversion processing unit 1004 to wait until a video-image input of a line obtained by adding READ_LINES to the line at the point of issuing an immediately-before SYNC command is finished.

In other words, a next command of the SYNC command is not executed until the line input corresponding to the value of READ_LINES is finished.

Other than the TRIANGLE commands and the SYNC command, the conversion specifying means 1009 includes a SYNCF command which detects the end of input of one frame, a WRITE command which changes set values of image converting means such as a read line number specifying means, an INT command which notifies the general-purpose computing means of an interrupt, and an END command indicating the end of conversion specification.

The image converting device of the present embodiment enables flexible usage methods by the group of these instructions of the conversion specifying means 1009.

The group of these instructions of the conversion specifying means 1009 is interpreted by the instruction decoder 1006. The interpreted contents are reflected to the image conversion processing unit 1004.

Figure 8:
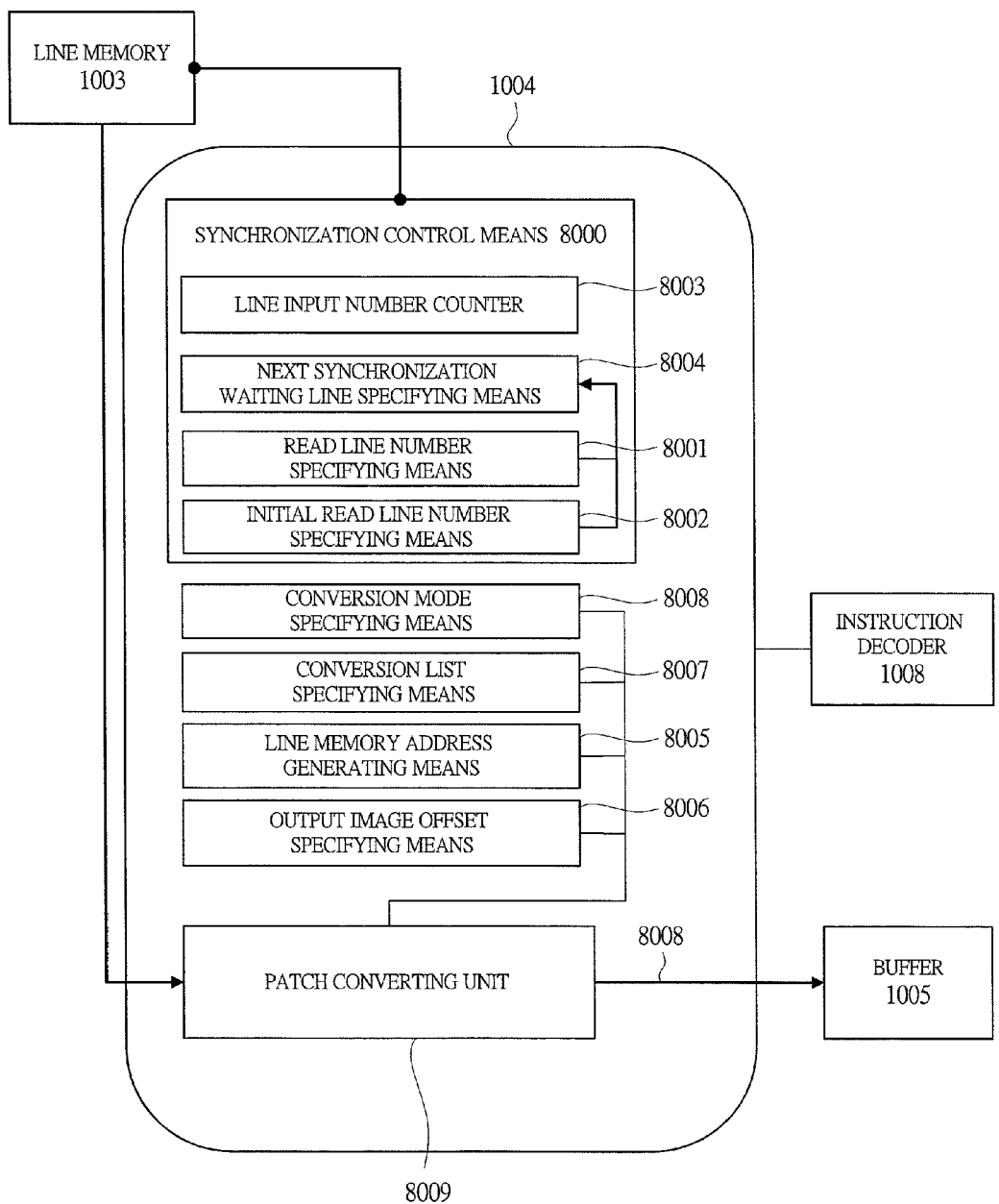
FIG. 8 illustrates a diagram illustrating details of an image conversion processing unit.

FIG. 8 is a diagram illustrating details of the image conversion processing unit 1004. With reference to FIG. 8, the configuration that realizes management of the coordinates of the SYNC command and the TRIANGLE command will be described.

The image conversion processing unit 1004 includes synchronization control means 8000, line memory address generating means 8005, output image offset specifying means 8006, conversion list specifying means 8007, conversion mode specifying means 8008, and a patch converting unit 8009. Moreover, the synchronization control means 8000 includes the read line number specifying means 8001, initial read line number specifying means 8002, a line input number counter 8003, and next synchronization waiting line specifying means 8004.

The read line number specifying means 8001 is a module which specifies READ_LINES.

The initial read line number specifying means 8002 is a module which specifies how many line inputs are waited for from the start of video-image input.

The synchronization control means 8000 synchronizes the line memory with the image converting means by utilizing the information items. In this process, the line input number counter 8003 and the next synchronization waiting line specifying means 8004 are provided.

The line input number counter 8003 has a function of retaining the number of already-input lines by, for example, receiving vertical synchronization signals, etc. from the image-pickup means 1002.

The next synchronization waiting line specifying means 8004 is a buffer module which retains lines to be waited for upon issuing a next SYNC command. The initial value of the next synchronization waiting line specifying means 8004 uses a value specified by the initial read line number specifying means 8002. When a SYNC command is issued, the line input number counter 8003 and the next synchronization waiting line specifying means 8004 are compared with each other, and the processing of the image conversion processing unit 1004 is kept waiting until the line input number counter 8003 reaches the line specified by the next synchronization waiting line specifying means 8004.

When the values of both of 8003 and 8004 become equal, the processing of the image conversion processing unit 1004 is resumed. When described in other words as the case of the conversion specifying means, a next command of the SYNC command is executed. Herein, the synchronization means is provided in the image converting means; however, the allocation thereof is not limited to that of the present embodiment. For example, a configuration in which the synchronization specifying means is retained outside of the image converting means is also conceivable.

The SRC vertex coordinates described in the TRIANGLE command are the coordinates of a vertex of a virtual input image as described above. Therefore, the image converting device has to once convert the coordinates to the coordinates in the line memory.

In this conversion, for example, the consistency between the coordinates and the address in the line memory 1003 can be achieved by checking the line input number counter 8003.

The line memory address generating means 8005 carries out management of these processes.

As a result of providing such means of coordinate conversion in the interior, the user at an external device is enabled to describe the conversion specifying means without worrying about the address in the line memory 1003.

By using the thus-converted vertex coordinates of the input side, the image in a triangle patch is read from the line memory 1003 to the patch converting unit 8009 in the image converting means and is subjected to conversion. Also regarding the output side, the DST coordinates described in the TRIANGLE command do not specify an address in the memory space of an output destination; therefore, an address offset has to be added to the coordinates. The output image offset specifying means 8006 is means which manages the offset.

In this manner, the image converting means manages the image address of the output destination.

The conversion list specifying means 8007 retains the address of a conversion list, which is on the storage medium, and specifies the conversion list to be read by an instruction decoder. An initial value of the conversion list specifying means 8007 is set by using a general-purpose computing device, etc.

A conversion list for converting a single image to a plurality of images by using a command group of the above-described conversion specifying means 1009 in the manner illustrated in FIG. 4 and FIG. 7 will be described with reference to FIG. 9.

FIG. 9 is a conceptual diagram about a conversion list 11001 which converts a single input image to a plurality of output images. Hereinafter, a flow of an actual conversion will be explained by using the conversion list 11001. Note that, herein, the number of lines of the line memory 1003 is assumed to be 10. However, the number is not limited to this one.

The address of the conversion list 11001, which is on the storage medium, is set in the conversion list specifying means 8007 so that the image conversion processing unit 1004 can read conversion instructions from the address. Values set in the read line number specifying means 8001 and the initial read line number specifying means 8002 are 3 and 5, respectively.

A row "a" and a row "b" in FIG. 9 are commands of carrying out these initial settings. The row a is a WRITE command of the setting of the initial value with respect to the read line number specifying means 8001. The row b is a WRITE command for the setting of the initial value with respect to the initial read line number specifying means 8002. In the diagram, the numbers on the diagrams appended to the present specification are used like 8001 and 8002 for the sake of convenience; however, denoting them by names for facilitating description does not cause any problem.

When the image converting means is activated in this state, the image converting means autonomously reads the conversion list 11001 from the address specified by the conversion list specifying means 8007, and the instructions thereof are interpreted and executed by the instruction decoder 1006.

The set values are reflected to the read line number specifying means 8001 and the initial read line number specifying means 8002 by the two WRITE commands of the row a and the row b of FIG. 9, and the image conversion processing unit 1004 is caused to be in a waiting state by an upcoming SYNC instruction.

Figure 10:
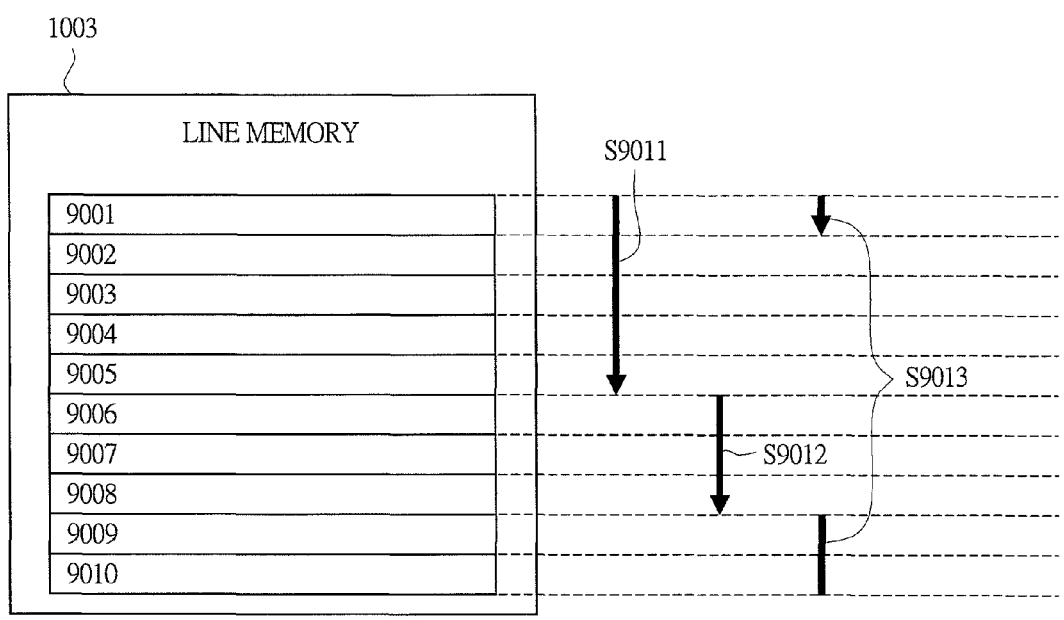
FIG. 10 illustrates an explanatory diagram of an outline of a line memory.

Herein, an outline of the line memory 1003 will be described. FIG. 10 is an explanatory diagram of the outline of the line memory 1003.

As is already described, the line memory 1003 has ten lines. In FIG. 10, the numbers 9001 to 9010 are allocated to the lines, respectively.

The input from the image-pickup means 1002 to the line memory 1003 is carried out by the number corresponding to the number of the lines specified by the row b of FIG. 9 (step S9011). When the process of step S9011 is finished, the synchronization control means 8000 detects that by the above-described configuration and resumes the process of the image conversion processing unit 1004. Also in the example of this diagram, line data of an image has already been input to the five rows from the line 9001 to the line 9005.

When a notification about the synchronization is given, a process of a next command group 11002 of the conversion list 11001 is executed. The command group 11002 is describing the conversion from the conversion object 7001 to the converted object 7002 of FIG. 7. In the command group 11002, the eight necessary TRIANGLE commands are omitted by ellipses for the sake of convenience.

According to a first WRITE command of the command group 11002, an offset DST_A of an in-storage-medium address of an output image A, which is in the storage medium, is written to the output image offset specifying means 8006, thereby specifying an output destination.

Next, the TRIANGLE commands are executed to carry out conversion of triangle patches. As the accessed line memory, the lines 9001 to 9005, wherein image input has already been finished, are the object.

The line memory serving as the object is assumed to have been converted from the coordinates specified by the TRIANGLE commands by the line memory address generating means 8005.

The output image data of the triangle patches read from the line memory is converted to triangle patches of the output image side by the patch converting unit 8009. The output data is output to the buffer (cache) in accordance with the address offset specified by the output image offset specifying means 8006.

In this manner, read, decode, and execution of the TRIANGLE instructions of 6002 in FIG. 6 are repeated to obtain output.

When the eight TRIANGLE commands for distortion conversion are finished, eight TRIANGLE commands for a through image are executed subsequently. This corresponds to a command group 11003 of FIG. 9, which is describing the conversion from the conversion object 7001 to the converted object 7003 in FIG. 7.

First, according to a WRITE command, an offset DST_B of an in-storage-medium address of an output image B, which is in the storage medium, is written to the output image offset specifying means 8006, thereby specifying an output destination again.

Then, the image converting means continues processing until a SYNCM command and starts a waiting state again.

In this manner, a plurality of pieces of output triangle patch data can be obtained at the same time from a single piece of input triangle patch data.

Figure 11:
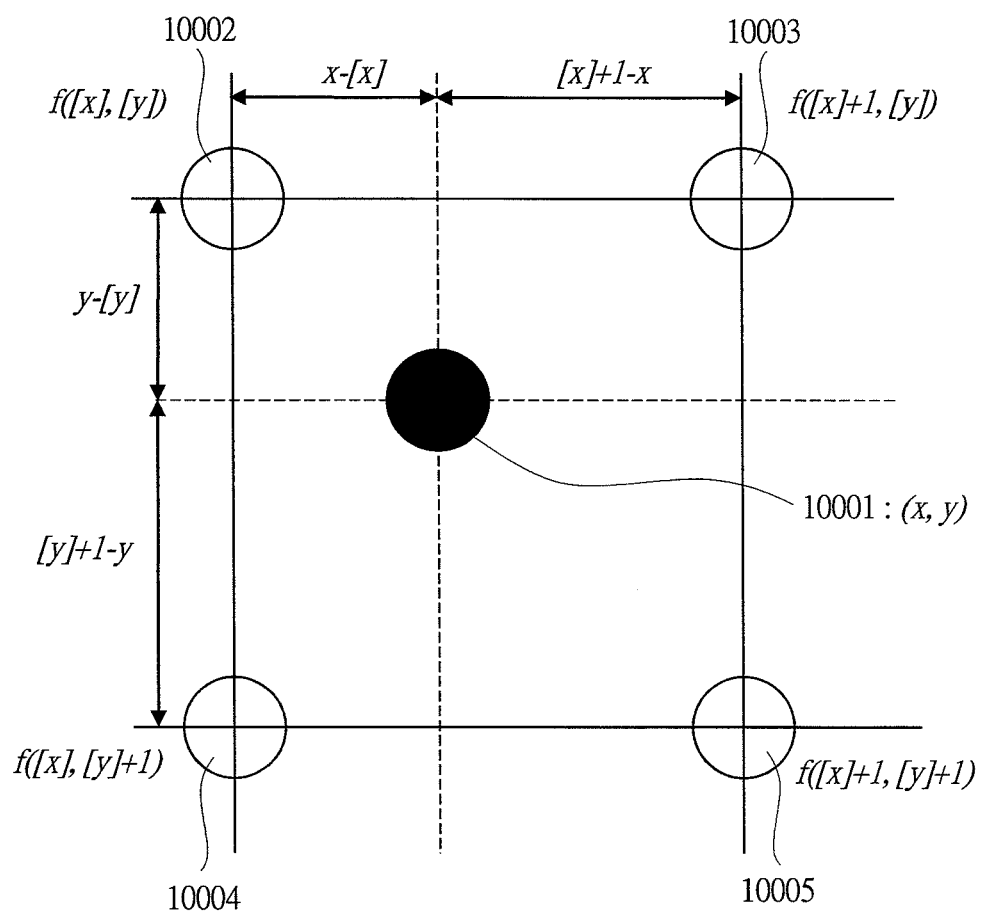
FIG. 11 illustrates a diagram facilitating the explanation of linear interpolation.

The reason of using five lines being more than three lines, which is a vertical size of the triangle patch of the input side, is that peripheral pixels are required as an interpolation process upon generation of the triangle patches of the output side. In the present embodiment, linear interpolation is presupposed as the interpolation process. FIG. 11 is a diagram facilitating the explanation of the linear interpolation.

The linear interpolation is a method in which, if coordinates 10001 cannot be specified by integers like FIG. 11, pixel values at the specified coordinates are obtained by using pixel values of surrounding integer coordinates 10002 to 10005.

A definitional equation of the interpolation process is shown below.

$$I(x,y)=([x]+1-x)([y]+1-y)f([x],[y])+([x]+1-x)(y-[y])f([x],[y]+1)+(x-[x])([y]+1-y)f([x]+1,[y])+(x-[x])(y-[y])f([x]+1,[y]+1)$$

[Expression 1]

I(x,y) represents the pixel values desired to be obtained, and f(x, y) represents a reference image. The symbol of parentheses [ ] is a Gauss symbol, wherein a maximum integer value not higher than the value in [ ] is returned. However, the interpolation method is not limited to the linear interpolation, and a method using the nearest neighbor method or the bicubic interpolation is also conceivable.

Also during the period in which these conversion processes are being carried out, input of image data from the image-pickup means to the line memory 1003 is continued.

The input lines are those subsequent to the line 9006. When a video-image input to the line 9008 is completed, the synchronization control means 8000 detects that again and executes a next command in the conversion specifying means (step S9012 of FIG. 10). The detected lines are three based on the value defined in the read line number specifying means 8001. In the conversion list 6001, the part after the SYNC command is omitted. However, the conversion processes of the patch groups subsequent to the converted object 7002 (the range of the output image 4003) and the converted object 7003 (the range of the output image 4005) of FIG. 7 are carried out. As well as 6002 in FIG. 6, the conversion specification thereof is specified by 16 TRIANGLE commands and one SYNC command. The image converting means executes the TRIANGLE commands for distortion conversion and the TRIANGLE commands for a through image, outputs results of changes to the buffer, and then waits the finish of the input to the next three lines of the line memory according to a SYNC command. The line memory used in this conversion is the five lines from 9004 to 9008. On the other hand, the line data of the image output from the image-pickup means is input to the next line 9009 and the line 9010, and the data then returns and be input to the line 9001 (S9013 of FIG. 10).

In other words, the line memory 1003 is used as a ring buffer.

In this manner, the line memory is used while switching the role thereof to the use for reading by the video-image converting means and the use for inputting the image data from the image-pickup means.

These processes are repeated, and two images can be finally obtained at the same time from the single image.

The size of the buffer (cache) 1005 is not big enough to retain all of output images. Therefore, at the point when a set of the converted data output from the image conversion processing unit 1004 is organized, the data is output to an image region 1012 in the storage medium 1007 and/or to the video-image displaying means 1011 such as a display. The buffer 1005 has a TLB (translation look-aside buffer), for example, like a general cache, thereby ensuring the output to, for example, the image region 1012 having a large size by using the small-size buffer.

In the present embodiment, as illustrated in FIG. 7, the vertical size of the triangle patches of the input side is fixed, and the lateral lines thereof are aligned, thereby restricting them so that they are arranged like strips. On the other hand, the shapes of the triangle patches of the output side are variable. This is for efficiently using a small amount of the line memory and suppressing the necessary number of the lines of the line memory.

Conversely, it is also conceivable to cause the input side to have variable shapes and cause the output side to have fixed shapes. When the conversion from an input image to an output image is carried out with this style, the lines to be referenced are not limited; therefore, a larger width of the line memory is required. On the other hand, if an attempt to limit the width of the line memory is made, the flexibility of the conversion is lost. Therefore, in the present embodiment, the sizes of the input side are fixed, and the shapes of the patches of the output side are arbitrary; as a result, flexible conversion can be carried out with a minimum number of the lines of the line memory.

However, the conversion specifying method is not limited to this, but may be a method in which, for example, both of the input and output sides have variable shapes depending on the use thereof or only one side of them has variable shape.

The conversion of generating the plurality of output triangle patches from the same single input triangle patch has been described here; however, the conversion is not limited to this. Mutually different input triangle patches may be used in one image conversion and in another image conversion.

As described above, the setting of the image conversion processing unit 1004 can be rewritten by a WRITE command. For example, whether an input image is to be treated as a color video-image or a grayscale image may be specified by the conversion mode specifying means 8008. In this case, for example, a color image can be output as the image of one side, and a grayscale image can be output as the image of the other side at a high speed while switching the modes using the function of the WRITE command.

Moreover, it is assumed that means capable of specifying the processing modes of contrast adjustment and noise reduction is present in the image conversion processing unit 1004. In this case, both of the images, i.e., an image which has undergone the contrast adjustment and an image which has undergone the noise reduction can be generated from one image input at a high speed by using the WRITE command.

In other words, although the conversion of the shapes of the images such as distortion correction has been described as an example in the present embodiment, it can be understood that the role played by the image converting means is not limited to that.

The conversion specifying means is saved in the storage medium and can be rewritten by the general-purpose computing means. Moreover, the image conversion specifying means can specify arbitrary conversion specifying means. By virtue of these two characteristics, the image converting device can carry out image conversion in accordance with a situation with saving the memory.

Figure 12:
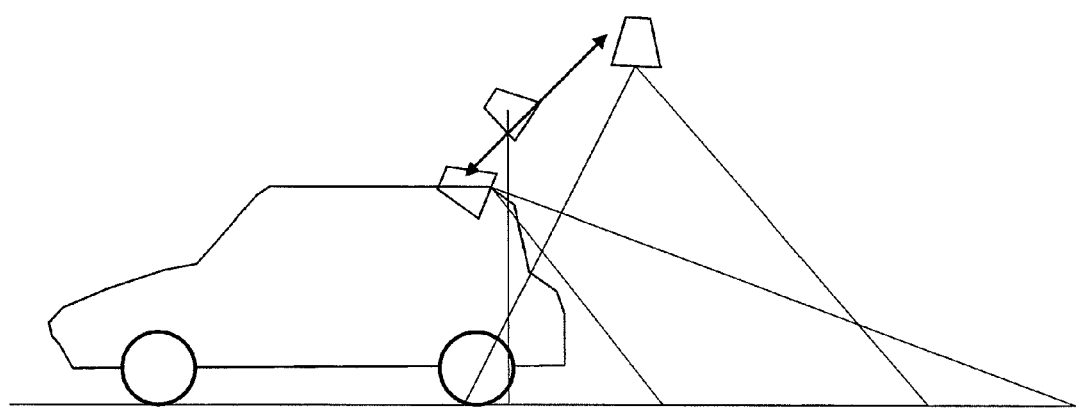
FIG. 12 illustrates a conceptual diagram illustrating a configuration in which viewpoint conversion is sequentially carried out.

For example, the case in which the positions of the viewpoints of cameras are sequentially switched as illustrated in FIG. 12 can be presupposed as the image conversion in accordance with the situation. FIG. 12 is a conceptual diagram illustrating the configuration in which the viewpoint conversion is sequentially carried out.

In this case, two conversion specifying means (conversion lists) are prepared. In a conceivable method, while one of them is being processed by the image converting means, the other description is rewritten and realized by general-purpose computing means.

In an existing method, if ten positions are required as the positions of the viewpoints of the cameras, they are used while carrying out ten times of the programming. If the conversion specifying means has a configuration which is fixed and cannot be changed, ten conversion lists have to be prepared. Furthermore, generating the images which are different from the viewpoint transform images is taken into consideration; and, if the number of the required different images is ten depending on the situation, 100 conversion lists have to be prepared in total because of the combinations of all of them, and there is a risk of large consumption of the memory region.

The present configuration is a configuration that avoids this risk.

Moreover, what has been described in the present embodiment is the configuration in which the number of each of the constituent elements of the image converting device is one. However, the configuration is not limited thereto, and possible arrangements include, for example, providing a plurality of image-pickup means 1002 connected to the image converting device 1001, increasing the number of the lines of the line memory 1003, and providing a plurality of line memories 1003 per se. Moreover, a configuration having a plurality of image converting devices 1001 per se is also conceivable.

Figure 13:
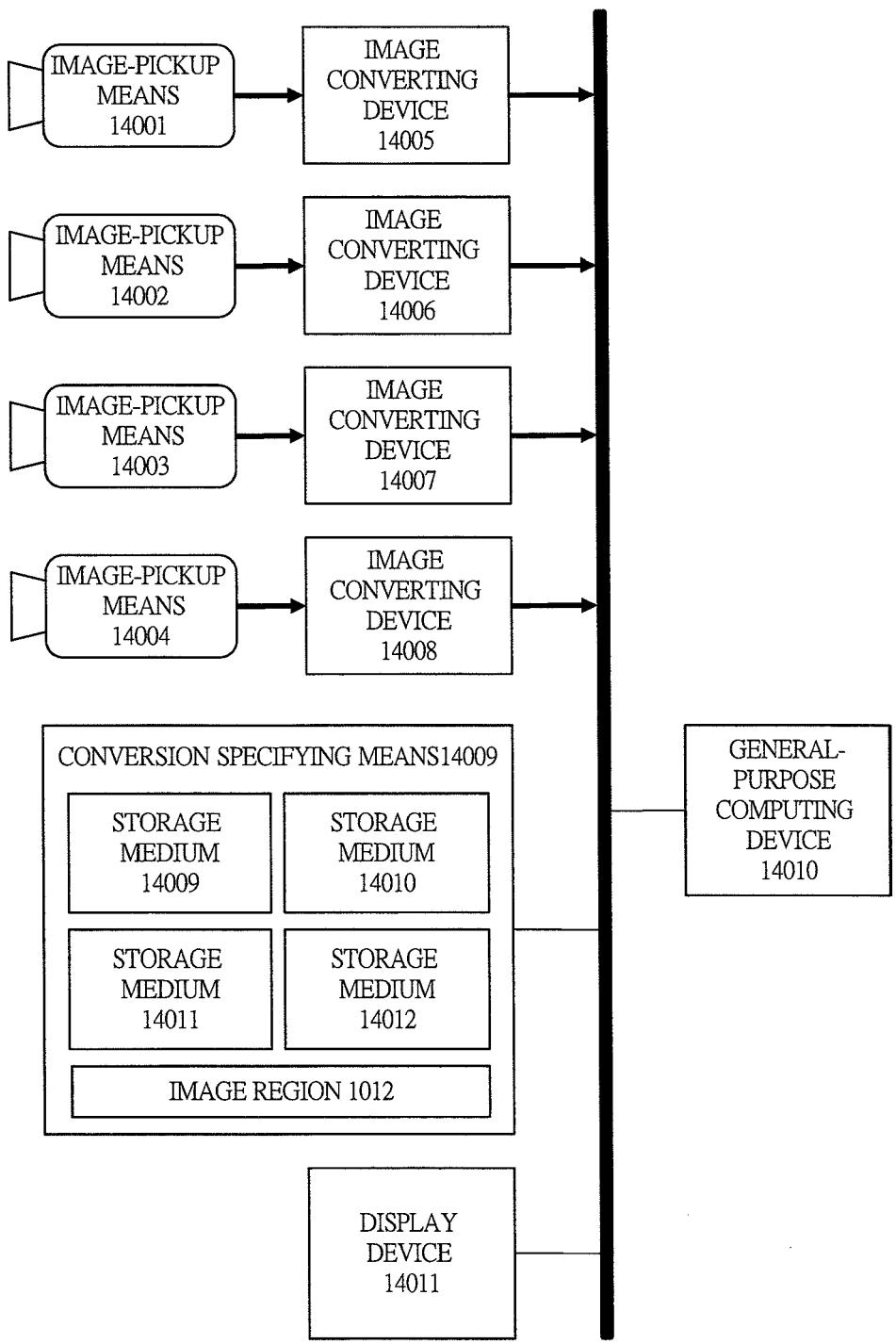
FIG. 13 illustrates a block diagram illustrating a configuration example of an image converting system equipped with a plurality of the image converting devices.

FIG. 13 is a block diagram illustrating a configuration example of an image converting system equipped with a plurality of the image converting devices.

An image converting device 14005 is connected to an image-pickup means 14001 one-to-one. Similarly, an image converting device 14006 is connected to an image-pickup means 14002, an image converting device 14007 is connected to an image-pickup means 14003, and an image converting device 14008 is connected to an image-pickup means 14004. The input images picked up by these image-pickup means are input to the corresponding image converting means. The conversion contents of the image converting devices are specified respectively in accordance with the specifications of conversion specifying means 14009 to 14012. Each of the image converting means converts the input image in accordance with the conversion method specified by the conversion specifying means. The output image after the conversion is output to a storage medium 14009 in the same memory region or to a display device 14011.

Image-pickup of the entire surrounding area can be carried out by utilizing this mechanism.

Figure 14:
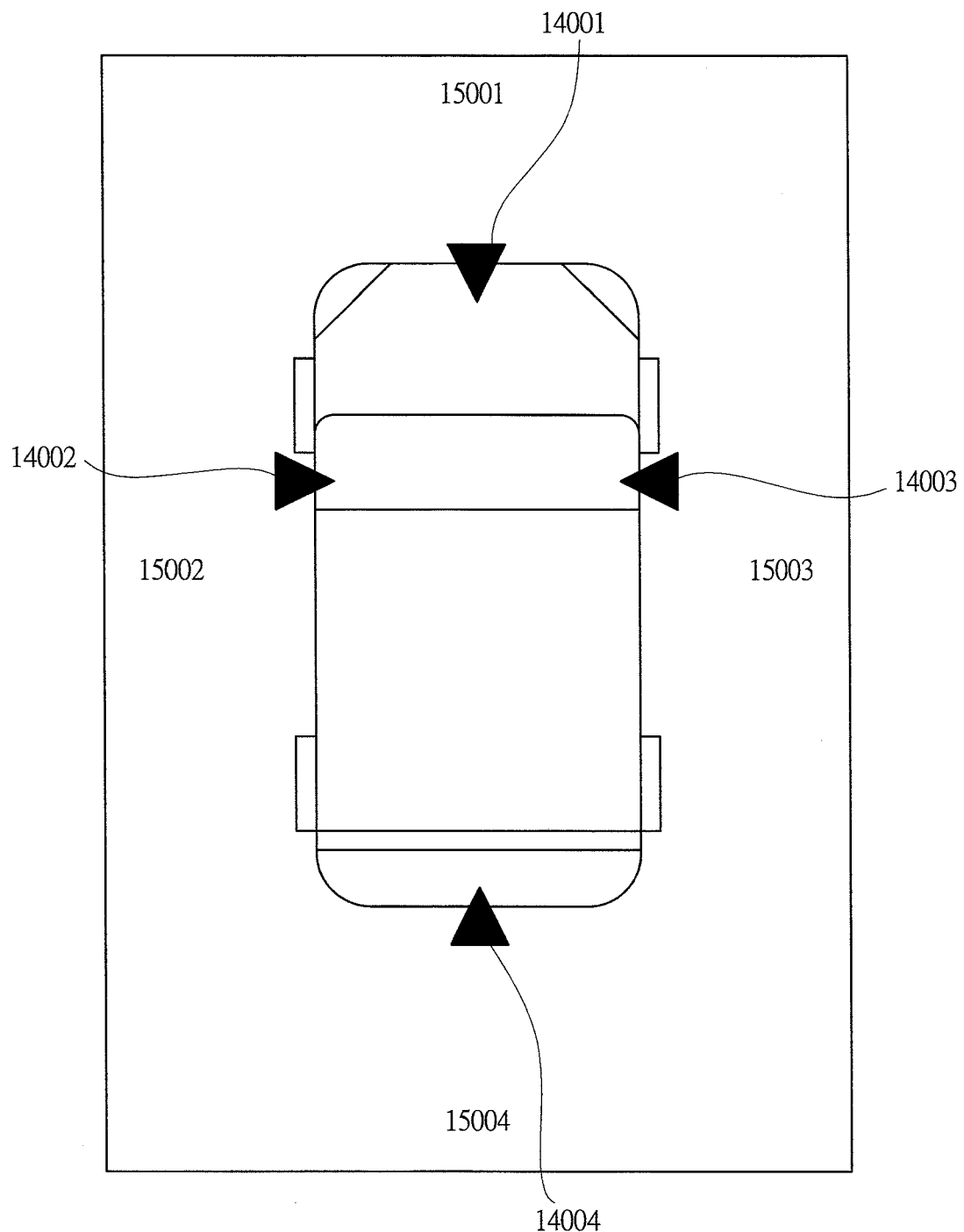
FIG. 14 illustrates a conceptual diagram illustrating a configuration of a surrounding-area display system using the configuration of the image converting system of FIG. 13 equipped with the plurality of image converting devices.

FIG. 14 is a conceptual diagram illustrating a configuration of a surrounding-area display system using the configuration of the image converting system of FIG. 13 equipped with a plurality of the image converting devices.

In the surrounding-area display system, the image-pickup means 14001 to 14004 are disposed so as to scan the four surrounding areas. The images obtained from these image-pickup means 14001 to 14004 are subjected to look-down conversion, and images 15001 to 15004 obtained therefrom are combined and displayed as one image.

In order to realize this system, the conversion specifying means 14012 of the image-pickup means 14004 at the rear of a vehicle is provided with an instruction which generates two images at the same time from the same input. Instructions which generate images of the image-pickup means 14001 to 14004 by the other conversion specifying means 14009 to 14012 are provided. Synchronization of the output images is realized by providing the conversion specifying means with interrupt instructions. The output destinations of the output images are specified to a video-image display means or the image region, thereby realizing the present system.

When a plurality of image converting means are used in this manner, more variable conversions can be realized at a high speed, and the possibility of various applications is expanded.

In the foregoing, the invention made by the inventors of the present invention has been concretely described based on the embodiments. However, it is needless to say that the present invention is not limited to the foregoing embodiments and various modifications and alterations can be made within the scope of the present invention.

The above-described conversion specifications based on the triangle patches are examples, and the conversion specifications are not limited thereto. As another applicable example, a map describing all of the correspondence between the image coordinates of input images and the image coordinates of output images is conceivable as another realization means.

The present invention presupposes utilization in image converting means which carries out correction with respect to an input image and obtains an output image and in application fields thereof. However, the present invention is not limited thereto, but can be implemented also in a display device having a circuit which carries out contrast adjustment, noise reduction processes, and the processes thereof as described in the body of the specification.

What is claimed is:

1. An image converting device comprising:
an image input device that obtains input image data;
an image converter that executes operation about image conversion in accordance with two or more instructions defining the operation;
a line memory used in transmission and reception of data between the image input device and the image converter; and
a conversion specifier that describes a corresponding relation between the input image data obtained into the line memory by the image input device and converted image data after conversion,
wherein
the conversion specifier is described by combining the instructions,
the operation or an output destination of the image converter is specified or changed during operation by interpreting the instructions,
the image converter generates a plurality of converted image data, different from each other, by executing different instructions with respect to the input image data in the line memory,
the conversion specifier describes correspondence between one region of the input image data and one region of the converted image data by triangle patches,
two or more of the triangle patches of an input side have a fixed vertical size and a base that is arranged along a horizontal line of the line memory so as to form a strip-like shape, and
two or more of the triangle patches of the converted image data have variable shapes.

2. The image converting device according to claim 1, further comprising:
a synchronizer that synchronizes image input to the line memory with the image converter in accordance with a waiting instruction that specifies input wait of the image data input to the line memory,
wherein the waiting instruction is present as an instruction of the two or more instructions defining the operation.

3. The image converting device according to claim 1, wherein the image converter reads the input image data from any position in the line memory.

4. The image converting device according to claim 3,
wherein two or more types of the conversion specifiers are disposed in a general-purpose storage medium, and
wherein one of the two or more types of the conversion specifiers in the general-purpose storage medium is selected for use.

5. The image converting device according to claim 4, wherein the conversion specifier is programmed by a general-purpose computing unit.

6. The image converting device according to claim 5, further comprising:
a video-image display by which a plurality of conversion results with respect to one video-image input are output.

* * * * *